United States Patent
Matsumoto et al.

(10) Patent No.: US 12,074,322 B2
(45) Date of Patent: Aug. 27, 2024

(54) SECONDARY BATTERY

(71) Applicant: Panasonic Intellectual Property Management Co., Ltd., Osaka (JP)

(72) Inventors: Hiroyuki Matsumoto, Osaka (JP); Nobuhiko Hojo, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 613 days.

(21) Appl. No.: 17/277,433

(22) PCT Filed: Jul. 25, 2019

(86) PCT No.: PCT/JP2019/029135
§ 371 (c)(1),
(2) Date: Mar. 18, 2021

(87) PCT Pub. No.: WO2020/066256
PCT Pub. Date: Apr. 2, 2020

(65) Prior Publication Data
US 2022/0037657 A1 Feb. 3, 2022

(30) Foreign Application Priority Data
Sep. 25, 2018 (JP) .................. 2018-179146

(51) Int. Cl.
*H01M 4/505* (2010.01)
*H01M 4/02* (2006.01)
(Continued)

(52) U.S. Cl.
CPC .......... *H01M 4/505* (2013.01); *H01M 4/525* (2013.01); *H01M 10/0568* (2013.01); *H01M 10/0569* (2013.01); *H01M 2004/028* (2013.01)

(58) Field of Classification Search
CPC .. H01M 4/505; H01M 4/525; H01M 10/0568; H01M 10/0569; H01M 2004/028
See application file for complete search history.

(56) References Cited

U.S. PATENT DOCUMENTS 6,645,667 B1 11/2003 Iwamoto et al.
2011/0045361 A1* 2/2011 Abe .................. H01M 10/0569
429/343
(Continued)

FOREIGN PATENT DOCUMENTS

CN 107403968 A 11/2017
CN 108140829 A 6/2018
(Continued)

OTHER PUBLICATIONS

International Search Report dated Sep. 17, 2019, issued in counterpart Application No. PCT/JP2019/029135. (2 pages).
(Continued)

*Primary Examiner* — Wyatt P McConnell
(74) *Attorney, Agent, or Firm* — WHDA, LLP (57) ABSTRACT

A positive electrode active material that is a composite oxide that is represented by the general formula $Li_aNi_xCo_yMn_zM_bO_2$, wherein $0.9<a<1.1$, $0.4\leq x<1.0$, $0\leq y<0.4$, $0\leq z<0.4$, $0\leq b<0.2$, $0.9<(x+y+z+b)<1.1$, and the element M includes at least one element from the group that consists of Ti, Zr, Hf, V, Nb, Ta, Cr, Mo, W, Al, Ga, and In. The ratio (B/A) of BET specific surface area (A) before particle compression testing and BET specific surface area (B) after particle compression testing of the composite oxide particles is 1.0-3.0.

6 Claims, 1 Drawing Sheet

(51) Int. Cl.
    *H01M 4/525*     (2010.01)
    *H01M 10/0568*     (2010.01)
    *H01M 10/0569*     (2010.01)

(56) References Cited

U.S. PATENT DOCUMENTS

| | | |
|---|---|---|
| 2013/0337345 A1 * | 12/2013 | Abouimrane ......... H01M 4/366 429/188 |
| 2016/0036041 A1 | 2/2016 | Uwai et al. |
| 2017/0222272 A1 | 8/2017 | Takami et al. |
| 2017/0256789 A1 | 9/2017 | Kao et al. |
| 2018/0261842 A1 | 9/2018 | Park et al. |

FOREIGN PATENT DOCUMENTS

| | | |
|---|---|---|
| JP | 2001-052747 A | 2/2001 |
| JP | 4581524 B2 | 11/2010 |
| JP | 2017-535027 A | 11/2017 |
| JP | 6321287 B2 | 5/2018 |
| WO | 2014/142279 A1 | 9/2014 |
| WO | 2015/156400 A1 | 10/2015 |

OTHER PUBLICATIONS

English translation of Search Report dated Oct. 17, 2023, issued in counterpart CN Application No. 201980059039.1. (3 pages).
English Translation of Chinese Search Report dated Apr. 29, 2024, issued in counterpart CN application No. 201980059039.1. (2 pages).

* cited by examiner

SECONDARY BATTERY

TECHNICAL FIELD

The present disclosure relates to a positive electrode active material for a secondary battery and a secondary battery.

BACKGROUND ART

Secondary batteries using an aqueous solution as an electrolytic solution are known. Secondary batteries using an aqueous solution as an electrolytic solution need to be used in an electric potential range in which the electrolytic reaction of water does not occur. An active material which is stable in an aqueous solution, and reversibly enables occluding and releasing a large amount of lithium in a potential range in which oxygen or hydrogen is not generated by water electrolysis, namely an active material which can exhibit large capacity in a specific potential range, needs to be used. It has been desired to use a neutral or alkaline electrolytic solution as an electrolytic solution. When a neutral electrolytic solution, namely an electrolytic solution of pH=7, is used, the hydrogen generating potential is 2.62 V and the oxygen generating potential is 3.85 V for the water decomposition voltage. When a strong alkaline electrolytic solution, namely an electrolytic solution of pH=14 is used, the hydrogen generating potential is 2.21 V and the oxygen generating potential is 3.44 V for the water decomposition voltage.

Therefore, a material from which more Li can be extracted before or when the potential reaches at least 3.85 V (pH=7) has been desired as a positive electrode active material. A material in which more Li can be inserted before or when the potential reaches 2.21 V (pH=14) has been desired as a negative electrode active material.

Patent Literature 1 discloses that a positive electrode active material for aqueous lithium secondary batteries has a compound having a layered structure and represented by the general formula $Li_sNi_xCo_yMn_zM_tO_2$ ($0.9 \leq s \leq 1.2$, $0.25 \leq x \leq 0.4$, $0.25 \leq y \leq 0.4$, $0.25 \leq z \leq 0.4$, $0 \leq t \leq 0.25$, and M is one or more selected from Mg, Al, Fe, Ti, Ga, Cu, V, and Nb) as the main ingredient.

CITATION LIST

Patent Literature

PATENT LITERATURE 1: Japanese Patent No. 4581524

SUMMARY

In secondary batteries using aqueous solutions as electrolytic solutions, technology which enables expanding a potential region in which electrolysis does not occur and improving the durability thereof, namely suppressing battery deterioration at the time of charge and storage has been required.

It is an advantage of the present disclosure to provide a positive electrode active material for a secondary battery and a secondary battery which enable suppressing battery deterioration at the time of charge and storage as to a secondary battery using an aqueous solution as an electrolytic solution.

The positive electrode active material for a secondary battery according to one aspect of the present disclosure is a positive electrode active material for a secondary battery having an electrolytic solution prepared by dissolving a lithium salt in water, wherein the positive electrode active material is a complex oxide represented by the general formula $Li_aNi_xCo_yMn_zM_bO_2$, $0.9 < a < 1.1$, wherein $0.4 \leq x < 1.0$, $0 \leq y < 0.4$, $0 \leq z < 0.4$, $0 \leq b < 0.2$, and $0.9 < (x+y+z+b) < 1.1$ are satisfied, and an element M includes at least one selected from the group consisting of Ti, Zr, Hf, V, Nb, Ta, Cr, Mo, W, Al, Ga, and In; and a ratio of a BET specific surface area after a particle compression test (B) to a BET specific surface area before the particle compression test (A) (B/A) of particles of the complex oxide is 1.0 or more and 3.0 or less.

According to the present disclosure, battery deterioration at the time of charge and storage may be suppressed.

DESCRIPTION OF EMBODIMENTS

The present inventors have earnestly examined and consequently found that the use of a specific material as a positive electrode active material in an electrolytic solution containing water as a solvent and a lithium salt as an electrolyte salt enables suppressing the deterioration of a secondary battery at the time of charge and storage.

Embodiments of the positive electrode active material and the secondary battery according to one aspect of the present disclosure will be described hereinafter. However, the embodiments described below is examples, and the present disclosure is not limited to these.

[Aqueous Electrolytic Solution]

An aqueous electrolytic solution according to the present embodiment includes at least water and a lithium salt. When an electrolytic solution containing water as a solvent is used, water decomposes at a voltage of 1.23 V theoretically. Therefore, the development of a secondary battery in which even though higher voltage is impressed, water does not decompose and which operates steadily has also been desired.

(Solvent)

The aqueous electrolytic solution contains water as the main solvent. Here, containing water as the main solvent means that the volume ratio of the water content to the total volume of solvents included in the electrolytic solution is 50% or more. The content of water included in the electrolytic solution is preferably 90% or more based on the total amount of the solvents in terms of the volume ratio. The solvent included in the electrolytic solution may be a mixed solvent including water and a non-aqueous solvent. Examples of the non-aqueous solvent include alcohols such as methanol; carbonates such as dimethyl carbonate, ethyl methyl carbonate, diethyl carbonate, ethylene carbonate, and propylene carbonate; acetone; acetonitrile; and aprotic polar solvents such as dimethyl sulfoxide.

Since the aqueous electrolytic solution includes water, which does not have inflammability, as the main solvent, the safety of the secondary battery using the aqueous electrolytic solution can be enhanced. The content of water is preferably 8% by mass or more, and more preferably 10% by mass or more based on the total amount of the electrolytic solution from this viewpoint. The content of water is preferably 50% by mass or less, and more preferably 20% by mass or less based on the total amount of the electrolytic solution.

(Lithium Salt)

As long as a lithium salt included in the aqueous electrolytic solution is a compound which is dissolved in the solvent containing water, dissociates, and enables lithium ions to exist in the aqueous electrolytic solution, any lithium salt can be used. The lithium salt does not preferably deteriorate battery characteristics by reaction with materials constituting a positive electrode and a negative electrode. Examples of such a lithium salt include salts with inorganic acids such as perchloric acid, sulfuric acid, and nitric acid; salts with halide ions such as chloride ions and bromide ions; and salts with organic anions including carbon atoms in structure.

Examples of the organic anions constituting lithium salts include anions represented by the following general formulae (i) to (iii).

$(R^1SO_2)(R^2SO_2)N^-$          (i)

wherein $R^1$ and $R^2$ are each independently selected from halogen atoms, alkyl groups, or halogen-substituted alkyl groups, and $R^1$ and $R^2$ may be bonded to each other to form a ring.

$R^3SO_3^-$          (ii)

wherein $R^3$ is selected from halogen atoms, alkyl groups, or halogen-substituted alkyl groups.

$R^4CO_2^-$          (iii)

wherein $R^4$ is selected from alkyl groups or halogen-substituted alkyl groups.

In the above-mentioned general formulae (i) to (iii), the alkyl group or the halogen-substituted alkyl group has preferably 1 to 6 carbon atoms, more preferably 1 to 3 carbon atoms, and further preferably 1 to 2 carbon atoms. As the halogen of the halogen-substituted alkyl group is preferably fluorine. The number of halogen atoms substituted in the halogen-substituted alkyl group is not more than the number of the hydrogen atoms of the original alkyl group. As halogen atoms in the above-mentioned general formulae (i) to (ii), a fluorine atom is preferable.

When each of $R^1$ to $R^4$ is, for example, a saturated alkyl group or a saturated halogen-substituted alkyl group, and $R^1$ to $R^2$ are not bonded to each other not to form a ring, each of $R^1$ to $R^4$ may be a group represented by the following general formula (iv).

$C_nH_aF_bCl_cBr_dI_e$          (iv)

wherein n is an integer of 1 or more, and a, b, c, d, and e are integers of 0 or more, and satisfy $2n+1=a+b+c+d+e$.

In the above-mentioned general formula (iv), a is preferably smaller, a=0 is more preferable, and $2n+1=b$ is the most preferable from the viewpoint of oxidation resistance.

Specific examples of the organic anion represented by the above-mentioned general formula (i) include bis(fluorosulfonyl)imide (FSI; $[N(FSO_2)_2]^-$), bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), and (perfluoroethanesulfonyl)(trifluoromethanesulfonyl)imide ($[N(C_2F_5SO_2)(CF_3SO_2)]^-$). Specific examples of the organic anion formed by binding $R^1$ to $R^2$ to each other to form a ring include cTFSI; ($[N(CF_2SO_2)_2]^-$). Specific examples of the organic anion represented by the above-mentioned general formula (ii) include $FSO_3^-$, $CF_3SO_3^-$, and $C_2F_5SO_3^-$. Specific examples of the organic anion represented by the above-mentioned general formula (iii) include $CF_3CO_2^-$ and $C_2F_5CO_2^-$.

Examples of an organic anion other than the above-mentioned general formula (i) include anions such as bis(1,2-benzenediolate(2-)-O,O')borate, bis(2,3-naphthalenediolate(2-)-O,O')borate, bis(2,2'-biphenyldiolate(2-)-O,O')borate, and bis(5-fluoro-2-olate-1-benzenesulfonate-O,O')borate.

As an anion constituting a lithium salt, an imide anion is preferable. Suitable specific examples of the imide anion include (fluorosulfonyl)(trifluoromethanesulfonyl)imide (FTI; $[N(FSO_2)(CF_3SO_2)]^-$) besides an imide anion illustrated as the organic anion represented by the above-mentioned general formula (i).

Specific examples of the lithium salt having a lithium ion and an imide anion include lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiFSI), and lithium (fluorosulfonyl)(trifluoromethanesulfonyl)imide (LiFTI).

Specific examples of other lithium salts include $CF_3SO_3Li$, $C_2F_5SO_3Li$, $CF_3CO_2Li$, $C_2F_5CO_2Li$, lithium bis(1,2-benzenediolate(2-)-O,O')borate, lithium bis(2,3-naphthalenediolate(2-)-O,O')borate, lithium bis(2,2'-biphenyldiolate(2-)-O,O')borate, lithium bis(5-fluoro-2-olate-1-benzenesulfonate-O,O')borate, lithium perchlorate ($LiClO_4$), lithium chloride (LiCl), lithium bromide (LiBr), lithium nitrate ($LiNO_3$), lithium sulfate ($Li_2SO_4$), lithium sulfide ($Li_2S$), and lithium hydroxide (LiOH).

In the aqueous electrolytic solution according to the present embodiment, the content ratio of water to the lithium salt is preferably a molar ratio of 15:1 or less, and more preferably 4:1 or less. It is because when the content ratio of water to the lithium salt is in these ranges, the potential window of the aqueous electrolytic solution can be expanded, and voltage impressed on the secondary battery can be further increased. The content ratio of water to the lithium salt is preferably a molar ratio of 1.5:1 or more from the viewpoint of the safety of the secondary battery.

(Additive)

The aqueous electrolytic solution according to the present embodiment may further include additives and other electrolytes known in the art. As the other electrolytes, a lithium ion conductive solid electrolyte may further be included. Examples of the additives include fluorophosphates, carboxylic acid anhydrides, alkaline-earth metal salts, sulfur compounds, acids, and alkalis. The aqueous electrolytic solution preferably further include at least one of the group consisting of fluorophosphates, carboxylic acid anhydrides, alkaline-earth metal salts, and sulfur compounds. The content of these additives is, for example, 0.10% by mass or more and 5.0% by mass or less based on the total amount of the aqueous electrolytic solution.

Examples of the fluorophosphates which may be added to the aqueous electrolytic solution include lithium fluorophosphates represented by the general formula $LixPFyOz$ ($1 \leq x < 3$, $0 < y \leq 2$, $2 \leq z < 4$). When the aqueous electrolytic solution contains a fluorophosphate, the electrolysis of water can be suppressed. Specific examples of the lithium fluorophosphate include lithium difluorophosphates ($LiPF_2O_2$) and lithium monofluorophosphates ($Li_2PFO_3$), and $LiPF_2O_2$ is preferable. The fluorophosphate represented by the general formula $Li_xPF_yO_z$ may be a mixture of two or more selected from $LiPF_2O_2$, $Li_2PFO_3$, and $Li_3PO_4$. In that case, x, y, and z may be numerical values other than integers. The content of the fluorophosphate may be, for example, 0.1% by mass or more, and is preferably 0.3% by mass or more based on the total amount of the aqueous electrolytic solution. The content of the lithium fluorophosphate may be, for example, 3.0% by mass or less, and is preferably 2.0% by mass or less based on the total amount of an aqueous electrolytic solution.

An alkaline-earth metal salt which may be added to the aqueous electrolytic solution is a salt having an ion of an alkaline-earth metal (Group 2 element) and an anion such as an organic anion. Examples of the alkaline-earth metal include beryllium (Be), magnesium (Mg), calcium (Ca), and strontium (Sr), and magnesium and calcium are preferable.

Examples of the organic anion constituting the alkaline-earth metal salt include organic anions described as the above-mentioned organic anions constituting lithium salts and represented by the general formulae (i) to (iii). However, the anion constituting the alkaline-earth metal salt may be an organic anion other than the organic anions represented by the general formulae (i) to (iii), or may be an inorganic anion.

The dissociation constant of the alkaline-earth metal salt in the aqueous electrolytic solution is preferably large. Suitable examples thereof include alkaline-earth-metal salts of perfluoroalkanesulfonic imides such as $Ca[N(CF_3SO_3)_2]_2$ (CaTFSI), $Ca[N(CF_3CF_2SO_2)_2]_2$ (CaBETI), $Mg[N(CF_3SO_3)_2]_2$ (MgTFSI), and $Mg[N(CF_3CF_2SO_2)_2]_2$ (MgBETI); alkaline-earth metal salts of trifluoromethanesulfonic acid such as $Ca(CF_3SO_3)_2$ and $Mg(CF_3SO_3)_2$; alkaline-earth metal perchlorates such as $Ca[ClO_4]_2$ and $Mg[ClO_4]_2$; and tetrafluoroborates such as $Ca[BF_4]_2$ and $Mg[BF_4]_2$. Among these, alkaline-earth metal salts of perfluoroalkanesulfonic imides are further preferable, and CaTFSI and CaBETI are particularly preferable from the viewpoint of plastic action. As the alkaline-earth metal salts, alkaline-earth metal salts having the same anion as the lithium salts included in the electrolytic solution are also preferable. The alkaline-earth metal salts may be used alone, or may be used in combination of two or more. The content of the alkaline-earth metal salt may be, for example, 0.5% by mass or more and 3% by mass or less, and is preferably 1.0% by mass or more and 2% by mass or less based on the total amount of the aqueous electrolytic solution from the viewpoint of the expansion of the potential window to the base potential side.

The carboxylic acid anhydrides which may be added to the aqueous electrolytic solution includes a cyclic carboxylic acid anhydride and a chain-like carboxylic acid anhydride. Examples of the cyclic carboxylic acid anhydride include succinic anhydride, glutaric anhydride, maleic anhydride, citraconic anhydride, glutaconic anhydride, itaconic anhydride, diglycollic anhydride, cyclohexanedicarboxylic acid anhydride, cyclopentanetetracarboxylic acid anhydride, and phenylsuccinic anhydride. The chain-like carboxylic acid anhydride is an anhydride of two carboxylic acids which are selected from carboxylic acids such as acetic acid, propionic acid, butyric acid, and isobutyric acid having 1 to 12 carbon atoms, and are the same or is different. Specific examples thereof include acetic anhydride and propionic anhydride. When the carboxylic acid anhydride is added to the aqueous electrolytic solution, the carboxylic acid anhydride may be used alone or in combination of two or more. The content of the carboxylic acid anhydride may be, for example, 0.10% by mass or more and 5.0% by mass or less, and is preferably 0.3% by mass or more and 2.0% by mass or less based on the total amount of the aqueous electrolytic solution.

Examples of a sulfur compound which may be added to the aqueous electrolytic solution include organic compounds containing a sulfur atom in a molecule and included in neither the above-mentioned lithium salts, polyvalent carboxylic acids nor alkaline-earth metal salts. When the aqueous electrolytic solution contains the sulfur compound, components contained in a film derived from the reduction reaction of anions such as TFSI and BETI represented by the general formulae (i) to (iii) can be compensated, and hydrogen generation which proceeds parasitically on a negative electrode can be shut off effectively. Specific examples of the sulfur compound include cyclic sulfur compounds such as ethylene sulfite, 1,3-propanesultone, 1,4-butanesultone, sulfolane, and sulfolene; sulfonic esters such as methyl methanesulfonate and busulfan; sulfones such as dimethyl sulfone, diphenyl sulfone, and methyl phenyl sulfone; sulfides or disulfides such as dibutyl disulfide, dicyclohexyl disulfide, and tetramethyl thiuram monosulfide; and sulfonamides such as N,N-dimethylmethanesulfonamide and N,N-diethylmethanesulfonamide. Among these sulfur compounds, ethylene sulfite, 1,3-propanesultone, 1,4-butanesultone, sulfolane, sulfolene, and the like are preferable, and ethylene sulfite is particularly preferable. When the sulfur compound is added to the aqueous electrolytic solution, the sulfur compound may be used alone or in combination of two or more. The content of the sulfur compound may be, for example, 0.1% by mass or more and 5.0% by mass or less, and is preferably 0.3% by mass or more and 2.0% by mass or less based on the total amount of the aqueous electrolytic solution.

The method for preparing the aqueous electrolytic solution according to the present embodiment is not particularly limited, for example, water and the lithium salt as well as the above-mentioned additives, if the additives are added, may be suitably mixed to prepare the aqueous electrolytic solution.

Although the pH of the aqueous electrolytic solution is not particularly limited, the pH may be, for example, 3 or more and 14 or less, and is preferably more than 10. It is because when the pH of the aqueous electrolytic solution is in these ranges, the stability of the positive electrode active material in the positive electrode and the negative electrode active material in the negative electrode in the aqueous solution can be improved, and the occlusion and release reactions of lithium ions in the positive electrode active material and the negative electrode active material are performed more smoothly.

[Secondary Battery]

A secondary battery according to an example of embodiments of the present disclosure will be described hereinafter. The secondary battery which is an example of the embodiments comprises the above-mentioned aqueous electrolytic solution, a positive electrode, and a negative electrode. The secondary battery has, for example, a structure in which an electrode assembly having the positive electrode, the negative electrode, and a separator and the aqueous electrolytic solution are stored in a battery case. Although examples of the electrode assembly include a wound electrode assembly, which is formed by winding the positive electrode and the negative electrode through the separator and a laminated electrode assembly, which is formed by laminating the positive electrode and the negative electrode through the separator, the shape of the electrode assembly is not limited to these.

Examples of the battery case which stores the electrode assembly and the aqueous electrolytic solution include cases made of metals or resins in a cylindrical shape, a square shape, a coin shape, a button shape, and the like and cases made of resins and obtained by molding a sheet in which metal foil and a resin sheet are laminated (laminated battery).

The secondary battery according to the present embodiment may be manufactured by a well-known method, and can be manufactured, for example, by storing the wound or laminated electrode assembly in the battery case body, pouring the aqueous electrolytic solution and then sealing the opening of the battery case body with a gasket and a sealing assembly.

[Positive Electrode]

The positive electrode constituting the secondary battery according to the present embodiment comprises, for example, a positive electrode current collector and a positive electrode active material layer formed on the positive electrode current collector. The positive electrode active material layer may be formed on one side of the positive electrode current collector, or may be formed on both sides. The positive electrode active material layer includes, for example, the positive electrode active material, a binding agent, a conductive agent, and the like.

As the positive electrode current collector, foil of a metal which is stable in the potential range of the positive electrode, a film wherein the metal is disposed on the outer layer, or the like can be used. As the positive electrode current collector, a porous body such as a mesh body, a punching sheet, or an expanded metal of the metal may be used. As the material of the positive electrode current collector, stainless steel, aluminum, an aluminum alloy, titanium, or the like can be used. The thickness of the positive electrode current collector is, for example, preferably 3 µm or more and 50 µm or less in terms of a current collection property, mechanical strength, and the like.

For example, positive electrode mixture slurry including the positive electrode active material, the conductive agent, the binding agent, and the like is applied to the positive electrode current collector and dried to form the positive electrode active material layer on the positive electrode current collector, and the positive electrode active material layer is rolled to obtain the positive electrode. As dispersion medium used for the positive electrode mixture slurry, for example, water; an alcohol such as ethanol; an ether such as tetrahydrofuran; N-methyl-2-pyrrolidone (NMP); or the like is used. Although the thickness of the positive electrode active material layer is not particularly limited, the thickness is, for example, 10 µm or more and 100 µm or less.

The positive electrode active material is a lithium transition metal oxide containing lithium (Li) and transition metal elements such as cobalt (Co), manganese (Mn), and nickel (Ni). A specific example of the lithium transition metal oxide is a complex oxide represented by $Li_aNi_xCo_yMn_zM_bO_2$ wherein $0.9<a<1.1$, $0.4≤x<1.0$, $0≤y<0.4$, $0≤z<0.4$, $0≤b<0.2$, and $0.9<(x+y+z+b)<1.1$.

Here, the element M is at least one selected from the group consisting of titanium (Ti), zirconium (Zr), hafnium (Hf), vanadium (V), niobium (Nb), tantalum (Ta), chromium (Cr), molybdenum (Mo), tungsten (W), aluminum (Al), gallium (Ga), and indium (In).

The lithium transition metal oxide contains preferably 40% by mol or more of nickel, and further preferably 80% by mol or more of nickel based on the total amount of transition metals other than lithium in view of increasing the capacity. That is, it is preferable that $0.4≤x<1.0$, and it is further preferable that $0.8≤x<1$. As the ratio of Li, it is preferable that $0.95<a/(x+y+z+b)<1.02$. It is preferable that $0.9<a<1.1$, $0<y<0.4$, $0≤z<0.4$, $0≤b<0.2$, and $0.9<(x+y+z)<1.1$ in view of the stability of the crystal structure. Here, since $z=0$ is included, $LiNiCoMO_2$ can be included in the complex oxide of the embodiment. Since $b=0$ is included, $LiNiCoMnO_2$ can be included in the oxide of the embodiment.

The ratio of the BET specific surface area after a particle compression test (B) to the BET specific surface area before the particle compression test (A) (B/A) of the complex oxide particles of the positive electrode active material is preferably 1.0 or more and 3.0 or less. The BET specific surface area before the particle compression test (A) is the BET specific surface area of complex oxide particles taken out by disassembling the secondary battery or the complex oxide particles to be used for the secondary battery. The BET specific surface area is a value measured in accordance with a BET method described in JIS R1626 (nitrogen adsorption method). The BET specific surface area after the particle compression test (B) is the BET specific surface area of the complex oxide particles after the complex oxide particles taken out by disassembling the secondary battery or the complex oxide particles to be used for the secondary battery are subjected to a compression test under the following conditions.

The particle compression test mentioned herein is a test in which positive electrode mixture slurry including the above-mentioned complex oxide particles, a conductive agent, a binding agent and the like is applied to a positive electrode current collector and dried to form a positive electrode active material layer, and the positive electrode mixture layer is rolled until the mixture density is 3.4 g/cc, and the complex oxide particles are compressed.

The ratio of the BET specific surface area after a particle compression test (B) to the BET specific surface area before the particle compression test (A) (B/A) is 1.0 or more and 3.0 or less, and it is shown thereby that almost all the surfaces of the primary particles are exposed. For example, unaggregated particles or the like satisfies the above-mentioned range. The unaggregated state include not only a state in which particles are completely separated into individual primary particles but also a state in which around several (for example, 2 to 15) primary particles are gathered. In the following description, there are passages in which "the ratio of the BET specific surface area after the particle compression test (B) to the BET specific surface area before the particle compression test (A) (B/A)" is called merely the B/A.

Figure 1:
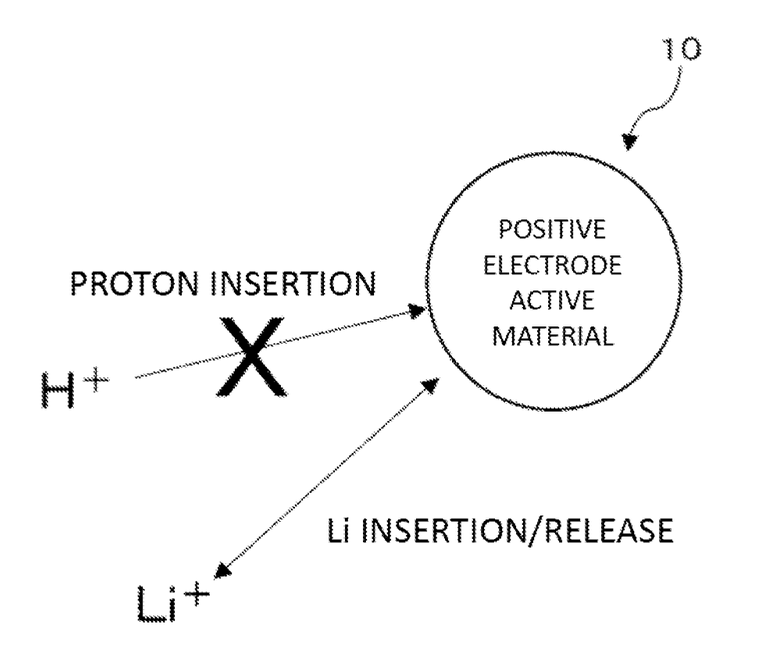
FIG. 1 is an operation explanatory diagram of an embodiment.

FIG. 1 shows an explanatory diagram of a positive electrode active material 10 according to the present embodiment. It is considered that, in a secondary battery, the positive electrode potential usually decreases due to self-discharge by proton insertion into the positive electrode active material 10 from an electrolytic solution, and the capacity especially when the positive electrode active material having a high nickel ratio is used can deteriorate. It is considered that, in the case where unaggregated complex particles having a B/A of 1.0 or more and 3.0 or less are used as the positive electrode active material, while the insertion and the release of lithium ions are permitted, proton insertion is suppressed, and a decrease in positive electrode potential is consequently suppressed.

In contrast, B/A of more than 3.0 means that the complex particles exist in a state of secondary particles in a positive electrode active material layer, and almost no surfaces of the primary particles of the complex particles are exposed. For example, the complex particles are secondary particles in which tens of primary particles or more are aggregated. Although the mechanism is not necessarily clear, the present inventors have observed that the primary particles and the secondary particles in which the primary particles are aggregated are different in the degree of proton insertion, and proton insertion occurs more markedly in the case of the secondary particles than in the case of the primary particles. Then, when the B/A is 1.0 or more and 3.0 or less, the unaggregated state can be achieved and the nickel ratio can be increased without causing a marked decrease in positive electrode potential, thereby achieving a nickel ratio of more than 80% by mol. Although the "unaggregated state" means a state in which particles are separated into individual primary particles, and also means a state wherein it can be said that the state is substantially a unaggregated state, specifically a state in which merely around 2 to 15 primary particles are aggregated.

The unaggregated state of the complex oxide particles may be observed by a sectional SEM image using a scanning electron microscope (SEM). For example, the positive electrode is embedded into a resin, a section of the positive electrode is prepared by cross section polisher (CP) processing or the like, and the section of the positive electrode active material layer in this section is photographed through the SEM. Alternatively, powder of the lithium transition metal oxide is embedded into a resin, a particle section of the lithium transition metal oxide is prepared by cross section polisher (CP) processing or the like, and this section is photographed through the SEM. Particles wherein the particle sizes confirmed in a sectional SEM image are in the error range of 10% or less from the volume average particle size are first selected, and the primary particle sizes are confirmed. Each primary particle and each aggregated particle are considered as true spheres, and the quantification of a state in which primary particles are gathered is calculated by the ratio of the volume of the primary particle to the volume estimated from the volume average particle size.

The average particle size (D50) of the complex oxide particles is preferably, for example, 2 μm or more and 20 μm or less. When the average particle size (D50) is less than 2 μm and more than 20 μm, the packing density in the positive electrode active material layer may decrease, and the capacity may decrease as compared with when the above-mentioned range is satisfied. Particles which are objects of the measurement of the average particle size include particles in not only a state in which particles are completely separated into individual primary particles but also a state in which around several (for example, 2 to 15) primary particles are gathered to be one particle. The average particle size (D50) of the positive electrode active material can be measured by laser diffractometry, for example, using MT3000II manufactured by MicrotracBEL Corp.

The compressive strength of the complex oxide particles is preferably 250 MPa or more, and more preferably 350 MPa or more. When the compressive strength of the complex oxide particles satisfies the above-mentioned range, the breakage of the particles due to charge and discharge is suppressed as compared with when the compressive strength does not satisfy the above-mentioned range. Since the breakage of the particles produces new surfaces on the particles, and leads to the occurrence of the surface deterioration in which the compound of nickel and oxygen is produced, the compressive strength of the complex oxide particles satisfies the above-mentioned range, and the suppression of an increase in the capacity deterioration rate after storage is enabled thereby. Although the upper limit value of the compressive strength of the complex oxide particles is not particularly limited, the upper limit value is preferably 1500 MPa or less, for example, from the viewpoint of the performance of the material. The compressive strength is measured by a method prescribed by JIS-R1639-5.

The content of the complex oxide particles is, for example, preferably 30% by mass or more and 100% by mass or less, and more preferably 80% by mass or more and 95% by mass or less based on the total amount of the positive electrode active material. When the content of the complex oxide particles with a high content of Ni in the positive electrode active material layer is less than 30% by mass, for example, the effect of suppressing an increase in the capacity deterioration rate after the charge and the storage of the battery may decrease as compared with when the content satisfies the above-mentioned range.

The content of the positive electrode active material is, for example, preferably 70% by mass or more and 99% by mass or less, and more preferably 80% by mass or more and 95% by mass or less based on the total amount of the positive electrode mixture layer.

An example of a method for producing complex oxide particles will be described.

A method for producing complex oxide particles include: a complex hydroxide synthesis step of obtaining a Ni, Co and Al complex hydroxide, a Ni, Co and Mn complex hydroxide, or the like; a raw material mixing step of mixing the complex hydroxide and a lithium compound to obtain a raw material mixture; and a firing step of firing the raw material mixture to obtain complex oxide particles with a high content of Ni.

Examples of the complex hydroxide synthesis step include a coprecipitation method for dropping a solution of an alkali such as sodium hydroxide with stirring a solution of metal salts including Ni, Co, Al (or Mn) and the like, and adjusting the pH to the alkali side (for example, 8.5 to 11.5) to deposit (coprecipitate) a Ni, Co and Al complex hydroxide or a Ni, Co and Mn complex hydroxide. The complex hydroxide synthesis step preferably includes an aging step of maintaining the complex hydroxide in the reaction solution as it is after the precipitation of the complex hydroxide. The complex oxide particles obtained finally is easily obtained as unaggregated particles thereby.

The raw material mixing step is a method of, for example, mixing the above-mentioned complex hydroxide and a lithium compound such as lithium hydroxide, lithium carbonate or lithium nitrate to obtain a raw material mixture. To adjust the ratio of the BET specific surface area after the particle compression test (B) to the BET specific surface area before the particle compression test (A) of the complex oxide particles obtained finally (B/A) to 1.0 or more and 3.0 or less, the mixing ratio of the complex hydroxide to the lithium compound, for example, the metallic elements (Ni+Co+Al or Mn):Li, is preferably adjusted to the range of 1.0:1.02 to 1.0:1.2 by molar ratio.

The firing step is a method, for example, for firing the above-mentioned raw material mixture in an oxygen atmosphere to obtain complex oxide particles. To adjust the ratio of the BET specific surface area after the particle compression test (B) to the BET specific surface area before the particle compression test (A) of the complex oxide particles obtained finally (B/A) to 1.0 or more and 3.0 or less, the firing temperature of the raw material mixture is preferably adjusted, for example, to the range of 750° C. or more and 1100° C. or less. The firing temperature is preferably 20 hours to 150 hours, and more preferably 20 hours to 100 hours. When the firing time of complex oxide particles is more than 150 hours, for example, the material physical properties or the electrochemical characteristics may be deteriorated as compared with when the firing time is 150 hours or less.

Examples of the conductive agent included in the positive electrode active material layer include carbon powders such as carbon black, acetylene black, ketjen black and graphite. These may be used singly or in combinations of two or more.

Examples of the binding agent included in the positive electrode active material layer include fluorine-containing polymers and rubber-based polymers. Examples of the fluorine-containing polymers include polytetrafluoroethylene (PTFE), polyvinylidene fluoride (PVDF), or modified product thereof. Examples of the rubber-based polymers include an ethylene-propylene-isoprene copolymer and an ethylene-propylene-butadiene copolymer. These may be used singly or in combinations of two or more.

The positive electrode of the present embodiment is obtained, for example, by forming a positive electrode active material layer on a positive electrode current collector by applying positive electrode mixture slurry including the positive electrode active material, the conductive agent, the binding agent and the like and drying the slurry, and rolling the positive electrode mixture layer.

[Negative Electrode]

The negative electrode constituting the secondary battery according to the present embodiment comprises, for example, a negative electrode current collector and a negative electrode active material layer formed on the negative electrode current collector. The negative electrode active material layer may be formed on one side of the negative electrode current collector, or may be formed on both sides. The negative electrode active material layer includes, for example, the negative electrode active material, a binding agent, and the like.

As the negative electrode current collector, foil of a metal which is stable in the potential range of the negative electrode, a film wherein the metal is disposed on the outer layer, or the like can be used. As the negative electrode current collector, a porous body such as a mesh body, a punching sheet, or an expanded metal of the metal may be used. As the material of the negative electrode current collector, copper, a copper alloy, aluminum, an aluminum alloy, stainless steel, nickel, or the like can be used. The thickness of the negative electrode current collector is, for example, preferably 3 μm or more and 50 μm or less in terms of a current collection property, mechanical strength, and the like.

For example, negative electrode mixture slurry including the negative electrode active material, the binding agent, and the dispersion medium is applied to the negative electrode current collector, the coating film is dried and then rolled, the negative electrode active material layer is formed on one side or both sides of the negative electrode current collector, and the negative electrode can be manufactured. The negative electrode active material layer may include optional components such as a conductive agent if required. Although the thickness of the negative electrode active material layer is not particularly limited, the thickness is, for example, 10 μm or more and 100 μm or less.

As long as the negative electrode active material is a material which enables occluding and emitting lithium ions, the negative electrode active material is not particularly limited. The material constituting the negative electrode active material may be a non-carbon-based material, may be a carbon material, or may be a combination thereof. Examples of the non-carbon-based material include a lithium metal and alloys including a lithium element as well as metallic compounds such as metal oxides, metal sulfides, and metal nitrides containing lithium. Examples of the alloys containing a lithium element include lithium-aluminum alloys, lithium-tin alloys, lithium-lead alloys, and lithium-silicon alloys. Examples of the metal oxides containing lithium include a metal oxide containing lithium and titanium, tantalum or niobium, and lithium titanate ($Li_4Ti_5O_{12}$ and the like) is preferable.

Examples of the carbon materials used as the negative electrode active material include graphite and hard carbon. Among others, graphite is preferable due to high capacity and small irreversible capacity. Graphite is a general term for a carbon material having graphite structure, and include natural graphite, artificial graphite, expanded graphite, and graphitized mesophase carbon particles. When graphite is used as the negative electrode active material, the surface of the negative electrode active material layer is preferably covered with a film to decrease the activity of the reductive decomposition of the aqueous electrolytic solution. These negative electrode active materials may be used alone or in combination of two or more.

As the binding agent included in the negative electrode active material layer, for example, a fluorine-containing polymer, a rubber-based polymer, or the like may be used in the same way as the positive electrode, and a styrene-butadiene copolymer (SBR) or a modified product thereof may be used. The content of the binding agent included in the negative electrode active material layer is preferably 0.1% by mass or more and 20% by mass or less, and more preferably 1% by mass or more and 5% by mass or less based on the total amount of the negative electrode active material. Examples of the thickener included in the negative electrode active material layer include carboxymethylcellulose (CMC) and polyethylene oxide (PEO). These may be used alone or in combination of two or more.

[Separator]

As long as the separator has functions of allowing lithium ions to permeate and electrically separating the positive electrode and the negative electrode, the separator is not particularly limited. As the separator, for example, a porous sheet or the like comprising a resin, an inorganic material, and the like is used. Specific examples of the porous sheet include fine porous thin films, woven fabrics and nonwoven fabrics. Examples of the resin material constituting the separator include olefin-based resins such as polyethylene and polypropylene; polyamides; polyamide-imides; and cellulose. Examples of the inorganic material constituting a separator include glass and ceramics such as borosilicate glass, silica, alumina, and titania. The separator may be a layered body having a cellulose fiber layer and a thermoplastic resin fiber layer of an olefin-based resin or the like. The separator may be a multilayer separator including a polyethylene layer and a polypropylene layer, and a separator wherein a material such as an aramid-based resin or a ceramic is applied to the surface of the separator may be used.

Although the secondary battery comprising the aqueous electrolytic solution was described in the above-mentioned embodiments, the aqueous electrolytic solution according to one example of the present embodiment may be used for a power storage device other than the secondary battery, and may be used, for example, for a capacitor. In this case, the capacitor comprises, for example, the aqueous electrolytic solution according to one example of the present embodiment and the two electrodes. The electrode materials constituting the electrodes can be used for the capacitor, and may be a material which enables occluding and emitting lithium ions. Examples thereof include materials such as a graphite-containing material such as natural graphite or artificial graphite and lithium titanate.

EXAMPLES

Although Examples and Comparative Examples of the present disclosure will be described specifically hereinafter, the present disclosure is not limited to the following Examples.

Example 1

$[Ni_{0.5}Co_{0.2}Mn_{0.3}](OH)_2$ obtained by a coprecipitation method and lithium carbonate were mixed in an Ishikawa-type grinding mortar so that the molar ratio of Li to the total amount of Ni, Co and Mn was 1.1:1.0. Then, this mixture was fired in the air atmosphere at 1000° C. for 20 hours to obtain complex oxide particles. The composition ratio was x:y:z=5:2:3 in $Li_aNi_xCo_yMn_zAl_bO_2$, and the ratio of Li, namely a/(x+y+z+b), was 1.03.

The obtained complex oxide particles were embedded into a resin, a section of the particles was prepared by cross section polisher (CP) processing, and this section was observed through a SEM. Consequently, the complex oxide particles existed in a state in which particles were completely separated into individual primary particles or a state in which 2 to 10 primary particles were gathered, and were unaggregated particles. When, in the positive electrode manufactured below, its section is observed through the SEM, the complex oxide particles existed in a state in which particles were completely separated into individual primary particles, or existed in a state in which 2 to 5 primary particles were gathered in the positive electrode mixture layer, and existed in a state of unaggregated particles in the positive electrode active material layer. The BET specific surface area of the obtained complex oxide particles was measured, a compression test was performed under the above-mentioned conditions, the BET specific surface area of the complex oxide particles after the compression test was measured. Consequently, in the obtained complex oxide particles, the ratio of the BET specific surface area after the particle compression test (B) to the BET specific surface area before the particle compression test (A) (B/A) was 1.4.

[Manufacturing of Positive Electrode]

The above-mentioned complex oxide particles as a positive electrode active material, acetylene black as a conductive agent, and polyvinylidene fluoride as a binding agent were mixed so that the mass ratio was 100:1:1. N-methyl-2-pyrrolidone was then added to prepare positive electrode mixture slurry. Subsequently, this positive electrode mixture slurry was applied to both sides of the positive electrode current collector comprising aluminum foil, and this was dried and then rolled with a rolling roller to manufacture a positive electrode in which positive electrode active material layers were formed on both sides of the positive electrode current collector.

[Manufacturing of Negative Electrode]

Graphite as a negative electrode active material, a styrene-butadiene copolymer (SBR) as a binding agent, and carboxymethyl cellulose (CMC) as a thickening agent were mixed so that the mass ratio was 100:1:1, water was added to prepare negative electrode mixture slurry. Subsequently, the negative electrode mixture slurry was applied to both sides of a negative electrode current collector comprising copper foil, and this was dried and then rolled with the rolling roller to manufacture a negative electrode in which negative electrode active material layers were formed on both sides of the negative electrode current collector.

[Production of Aqueous Electrolytic Solution]

Lithium bis(trifluoromethanesulfonyl)imide (LiN$(SO_2CF_3)_2$), lithium bis(perfluoroethanesulfonyl)imide (LiN$(SO_2C_2F_5)_2$), lithium hydroxide, and water (ultrapure water) were mixed at a molar ratio of 0.7:0.3:0.034:1.932. The content of water based on the total amount of the electrolytic solution was 10% by mass, and the molar ratio of water to the lithium salts contained in the electrolytic solution was 2:1.

[Manufacturing of Secondary Battery]

The above-mentioned positive electrode and negative electrode were wound through a separator to manufacture an electrode assembly, the electrode assembly was stored with the above-mentioned aqueous electrolyte in a bottomed cylindrical battery case, and the opening of the battery case was sealed with a gasket and a sealing assembly. This was used as the secondary battery of Example 1.

Example 2

$[Ni_{0.82}Co_{0.15}Al_{0.03}](OH)_2$ obtained by a coprecipitation method and lithium hydroxide were mixed in an Ishikawa-type grinding mortar so that the molar ratio of Li to the total amount of Ni, Co and Al was 1.1:1.0. Then, this mixture was fired in an oxygen atmosphere at 780° C. for 50 hours to obtain complex oxide particles according to Example 2. In $Li_aNi_xCo_yAl_bO_2$, the ratio of nickel x was 82%, and the ratio of Li, namely a/(x+y+z+b), was 0.98. The obtained complex oxide particles were embedded into a resin, and a section of the particles was prepared by cross section polisher (CP) processing, and this section was observed by a SEM. Consequently, the complex oxide particles existed in a state in which particles were completely separated into individual primary particles or a state in which 2 to 10 primary particles were gathered, and were unaggregated particles. When, in the positive electrode manufactured below, the section thereof was observed by a SEM, the complex oxide particles existed in the positive electrode mixture layer in a state in which particles were completely separated into individual primary particles or a state in which 2 to 5 primary particles were gathered, and existed in the positive electrode active material layer as unaggregated particles.

The BET specific surface area of the obtained complex oxide particles was measured, a compression test was performed under the above-mentioned conditions, the BET specific surface area of the complex oxide particles after the compression test was measured. Consequently, in the obtained complex oxide particles, the ratio of the BET specific surface area after the particle compression test (B) to the BET specific surface area before the particle compression test (A) (B/A) was 1.9.

In Example 2, a secondary battery was manufactured in the same way as in Example 1 except that the complex oxide particles according to Example 2 was used as the positive electrode active material.

Comparative Example 1

In the manufacturing of complex oxide particles, the complex oxide particles were obtained in the same way as in Example 1 except that the firing temperature was changed into 900° C. The ratio of Li of the complex oxide particles in Comparative Example 1, namely a/(x+y+z+b), was 1.06.

The complex oxide particles obtained in Comparative Example 1 were embedded into a resin, and a section of the particles was prepared by cross section polisher (CP) processing. When this section was observed by a SEM, the complex oxide particles of Comparative Example 1 were aggregated particles in which tens of primary particles or more were gathered.

When, in the positive electrode manufactured using the complex oxide particles of Comparative Example 1, the section thereof was observed by a SEM, the complex oxide particles existed in the positive electrode active material layer as aggregated particles in which tens of primary particles or more were gathered.

The BET specific surface area of the complex oxide particles according to Comparative Example 1 was measured, a compression test was performed under the above-mentioned conditions, the BET specific surface area of the complex oxide particles after the compression test was measured. Consequently, in the obtained complex oxide particles, the ratio of the BET specific surface area after the particle compression test (B) to the BET specific surface area before the particle compression test (A) (B/A) was 5.0.

In Comparative Example 1, a secondary battery was manufactured in the same way as in Example 1 except that the complex oxide particles according to Comparative Example 1 were used as the positive electrode active material.

Comparative Example 2

In the manufacturing of complex oxide particles, the complex oxide particles were obtained in the same way as in Example 2 except that the firing temperature was changed into 900° C. The ratio of Li of the complex oxide particles in Comparative Example 2, namely a/(x+y+z+b), was 0.98.

The complex oxide particles obtained in Comparative Example 2 were embedded into a resin, and a section of the particles was prepared by cross section polisher (CP) processing. When this section was observed by a SEM, the complex oxide particles of Comparative Example 2 were aggregated particles in which tens of primary particles or more were gathered.

When, in the positive electrode manufactured using the complex oxide particles of Comparative Example 2, the section thereof was observed by a SEM, the complex oxide particles existed in the positive electrode active material layer as aggregated particles in which tens of primary particles or more were gathered.

The BET specific surface area of the complex oxide particles according to Comparative Example 2 was measured, a compression test was performed under the above-mentioned conditions, the BET specific surface area of the complex oxide particles after the compression test was measured. Consequently, in the obtained complex oxide particles, the ratio of the BET specific surface area after the particle compression test (B) to the BET specific surface area before the particle compression test (A) (B/A) was 6.9.

In Comparative Example 2, a secondary battery was manufactured in the same way as in Example 1 except that the complex oxide particles according to Comparative Example 2 were used as the positive electrode active material.

Comparative Example 3

In the manufacturing of complex oxide particles in Comparative Example 3, the complex oxide particles were obtained in the same way as in Comparative Example 2 except that $[Ni_{0.82}Co_{0.15}Al_{0.03}](OH)_2$ and lithium hydroxide were mixed so that the molar ratio of Li to the total amount of Ni, Co, and Al was 1.15:1.0. The ratio of Li of the complex oxide particles in Comparative Example 3, namely a/(x+y+z+b), was 1.02.

The complex oxide particles obtained in Comparative Example 3 were embedded into a resin, and a section of the particles was prepared by cross section polisher (CP) processing. When this section was observed by a SEM, the complex oxide particles of Comparative Example 3 were aggregated particles in which tens of primary particles or more were gathered.

When, in the positive electrode manufactured using the complex oxide particles of Comparative Example 3, the section thereof was observed by a SEM, the complex oxide particles existed in the positive electrode active material layer as aggregated particles in which tens of primary particles or more were gathered.

The BET specific surface area of the complex oxide particles according to Comparative Example 3 was measured, a compression test was performed under the above-mentioned conditions, the BET specific surface area of the complex oxide particles after the compression test was measured. Consequently, in the obtained complex oxide particles, the ratio of the BET specific surface area after the particle compression test (B) to the BET specific surface area before the particle compression test (A) (B/A) was 6.9.

In Comparative Example 3, a secondary battery was manufactured in the same way as in Example 1 except that the complex oxide particles according to Comparative Example 3 were used as the positive electrode active material.

[Measurement of Voltage Decrease after Charge and Storage]

As to the secondary batteries of Examples and Comparative Examples, the voltage decreases after charge and storage were measured under the following conditions. Each battery was charged at a constant current of 0.1 C until the closed circuit voltage of the battery reached 2.75 V. The battery was then stored at 25° C. for 72 hours, and the amount of change in the open circuit voltage of the battery (V) was determined. The charge and storage test was performed under the condition of 25° C. The amount of change in the open circuit voltage (V) was used as the index of the stability at the time of charge and storage.

Table 1 shows the results of the charge and storage test in the secondary batteries of Examples and Comparative Examples (25° C., 3 days).

TABLE 1

| | Positive electrode material | | | Storage test result (at 25° C. for 3 days) |
|---|---|---|---|---|
| | Active material | BET after compression/ BET before ompression | Li/Me ratio | Voltage decrease V |
| Example 1 | NCM(523) | 1.4 | 1.03 | −0.122 |
| Comparative Example 1 | NCM(523) | 5.0 | 1.06 | −0.162 |
| Example 2 | NCA(Ni82) | 1.9 | 0.98 | −0.131 |
| Comparative Example 2 | NCA(Ni82) | 6.9 | 0.98 | −0.168 |
| Comparative Example 3 | NCA(Ni82) | 6.9 | 1.02 | −0.229 |

The voltage decreases after the charge and storage test of Examples 1 and 2, wherein, in the above-mentioned complex oxide particles, the ratios of the BET specific surface areas after the particle compression tests (B) to the BET specific surface areas before the particle compression tests (A) (B/A) are 1.0 or more and 3.0 or less, and Examples 1 and 2 use the aqueous electrolytic solutions, exhibit low values as compared with Comparative Examples 1 to 3 wherein the B/A ratios do not satisfy the above-mentioned range, and the battery deterioration at the time of charge and storage is suppressed.

The invention claimed is:

1. A secondary battery, comprising:
a positive electrode containing the positive electrode active material;
a negative electrode containing a negative electrode active material; and
an electrolytic solution prepared by dissolving a lithium salt in water, wherein
the positive electrode active material is a complex oxide represented by the general formula $Li_aNi_xCo_yMn_zM_bO_2$, wherein
$0.9<a<1.1$,
$0.4\leq x<1.0$,
$0\leq y<0.4$,
$0\leq z<0.4$,
$0\leq b<0.2$, and
$0.9<(x+y+z+b)<1.1$
are satisfied, and
an element M includes at least one selected from the group consisting of Ti, Zr, Hf, V, Nb, Ta, Cr, Mo, W, Al, Ga, and In; and
a ratio of a BET specific surface area after a particle compression test (B) to a BET specific surface area before the particle compression test (A) (B/A) of particles of the complex oxide is 1.0 or more and 3.0 or less.

2. The secondary battery according to claim 1, wherein a, x, y, z, and b in the general formula satisfy $0.95<a/(x+y+z+b)<1.02$.

3. The secondary battery according to claim 1, wherein x in the general formula satisfies $0.8<x<1$.

4. The secondary battery according to claim 1, wherein the element M includes at least Al.

5. The secondary battery according to claim 1, wherein a pH of the electrolytic solution is more than 10.

6. A secondary battery, comprising:
a positive electrode containing the positive electrode active material;
a negative electrode containing a negative electrode active material; and
an electrolytic solution prepared by dissolving a lithium salt in water, wherein
the positive electrode active material is a complex oxide represented by the general formula $Li_aNi_xCo_yMn_zM_bO_2$, wherein
$0.9<a<1.1$,
$0.4\leq x<1.0$,
$0\leq y<0.4$,
$0\leq z<0.4$,
$0\leq b<0.2$, and
$0.9<(x+y+z+b)<1.1$
are satisfied, and
an element M includes at least one selected from the group consisting of Ti, Zr, Hf, V, Nb, Ta, Cr, Mo, W, Al, Ga, and In; and
particles of the complex oxide are in a state in which the complex oxide particles are separated into individual primary particles and/or a state in which 2 to 15 primary particles are gathered.

* * * * *